Nov. 22, 1938.　　R. S. SANFORD ET AL　　2,137,954
VEHICLE CONTROL MECHANISM
Filed March 5, 1936
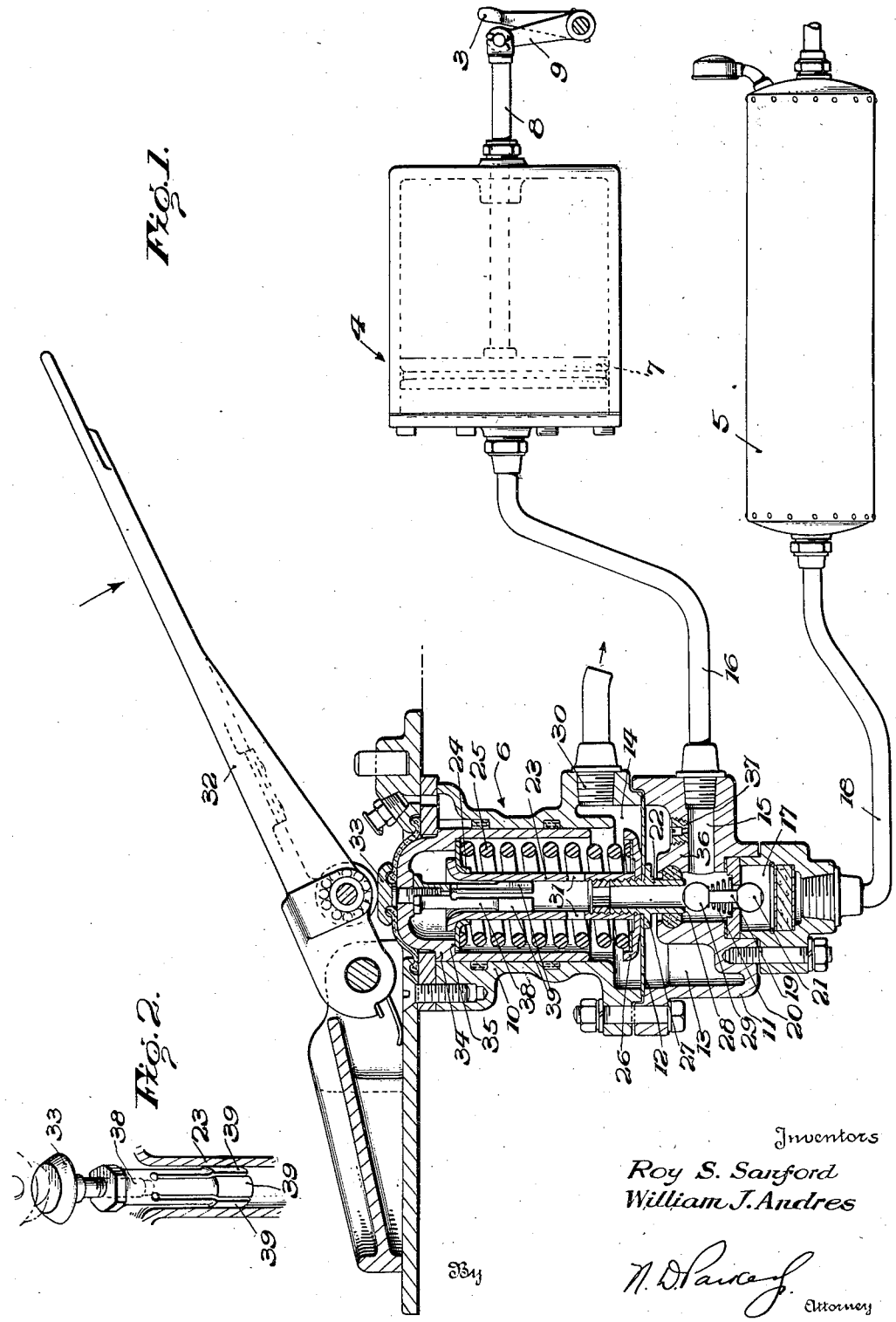
Inventors
Roy S. Sanford
William J. Andres
By N. D. Parker
Attorney Patented Nov. 22, 1938

2,137,954

UNITED STATES PATENT OFFICE 2,137,954

VEHICLE CONTROL MECHANISM

Roy S. Sanford, New York, N. Y., and William J. Andres, Pittsburgh, Pa., assignors to Bendix-Westinghouse Automotive Air Brake Company, Pittsburgh, Pa., a corporation of Delaware Application March 5, 1936, Serial No. 67,378

21 Claims. (Cl. 303—54)

This invention relates to control mechanism for motor vehicles and more particularly to a construction whereby control devices of such vehicles may be efficiently operated from a remote control station.

It has heretofore been proposed to control the operation of vehicle control devices, such as for example, brakes, clutches, carburetor throttle valves, etc., from a remote control station through the medium of fluid energy. One of the important problems in such remote controlling arrangements is to seek to construct the various parts so as to simulate as closely as possible direct manual operation of the vehicle control devices. In the control of vehicle clutches, for example, it is extremely important that a precise and instantaneous control be obtained, especially during engagement of the clutch parts, to the end that the clutch will be engaged smoothly and efficiently.

One form of prior art device for remotely controlling a vehicle clutch or other controlling element through the medium of fluid pressure employs a self-lapping valve mechanism, operable by means of a suitable pedal. While the operation of such an arrangement in controlling a vehicle clutch has been satisfactory, yet it has been found that an appreciable movement of the control pedal is required in order to establish the proper pressures in the clutch motor for effecting proper operation of the latter through the critical state of actual engagement of the clutch.

It is accordingly one of the objects of the present invention to provide a remote control mechanism for vehicle clutches which shall be so constituted as to materially simplify the control of such clutches from a remote control station.

Another object is to provide, in a fluid pressure-operated clutch, a novel remote control device operable to graduate within close limits the flow of pressure fluid to and from the clutch motor.

Still another object is to provide, in a structure of the above type, a novel control valve mechanism for effecting a rapid reversal of flow of fluid to the clutch motor with a minimum of effort on the part of the operator.

A further object is to provide a novel self-lapping fluid pressure valve device wherein the valve is so arranged as to effect a quick reversal of the pressure-responsive element thereof upon slight movement in either direction of the operating pedal, whereby a rapid reversal of fluid flow to a motor, supplied from the valve, is secured.

A still further object is to provide a novel self-lapping valve device of the above character embodying relatively few parts, capable of economical manufacture and so constituted as to be readily adaptable to the control of motor vehicle controlling elements of the present-day commercial form.

Other objects and novel features of the invention will appear more fully hereinafter from the following detailed description when taken in connection with the accompanying drawing, wherein one form of the invention is illustrated. It is to be expressly understood, however, that the drawing is employed for purposes of illustration only and is not designed as a definition of the limits of the invention, reference being had for this purpose to the claims appended hereto.

In the drawing, wherein similar reference characters refer to similar parts throughout the several views:

Fig. 1 is a diagrammatic view, certain parts of which are shown in section, of a vehicle-controlling device constructed in accordance with the present invention, and Fig. 2 is an enlarged perspective view of one of the parts shown in Fig. 1.

Referring now to Fig. 1 of the drawing, the present invention is illustrated therein as being applied to a vehicle clutch-controlling member 3, although it will be understood that the invention is not limited to the control of the vehicle clutch but may be utilized in connection with any vehicle control element which is desired to be operated from a remote control station. As shown in Fig. 1, the clutch-controlling element 3 is adapted to be operated by a fluid motor 4, the control of fluid pressure thereto from a reservoir 5 being effected through a manually-operable self-lapping valve mechanism 6.

More particularly, the fluid motor 4 is provided with a pressure-responsive element 7 operatively connected through rod 8 and lever 9 with the clutch-controlling element 3 and the construction is such that fluid pressure supplied to the motor 4 effects operation of the element 3 in order to disengage the vehicle clutch, not shown, in opposition to the usual return springs associated therewith. It will be also understood that the release of fluid pressure from the motor 4 controls the engaging movement of the clutch element 3.

The manually-operable valve mechanism 6 is effective to graduate the pressure of the fluid flowing from the reservoir 5 to the motor 4 as well as to graduate the exhaust of fluid from the latter, and such valve mechanism is preferably constructed as disclosed in the application of William J. Andres and Roy S. Sanford, Serial No. 57,411, filed January 3, 1936. As shown, the valve mechanism comprises upper and lower casing sections 10 and 11 having a pressure-responsive element such as a diaphragm 12 clamped therebetween, the said diaphragm dividing the valve casing into a diaphragm chamber 13 and an exhaust chamber 14. The lower casing section 11 is provided with an outlet chamber 15 having a conduit connection 16 with the fluid motor 4. The said lower casing section is also provided with an intake chamber 17 communicating with the reservoir 5 through a conduit connection 18.

In order to control the flow of fluid pressure from the intake chamber 17 to the outlet chamber 15 and from the latter to the exhaust chamber 14, a combined inlet and exhaust valve assembly 19 is provided which is normally urged to the position shown as by means of a spring 20. In this position, flow of fluid pressure from the reservoir 5 to conduit 16 is prevented by intake valve 21 which is closed.

The diaphragm 12 carries a hollow exhaust element 22 which is threadedly secured to a hollow stem 23, the upper end portion of which carries a seat 24 for one end of a graduating spring 25, the opposite end of said spring bearing against a lower seat 26 clamped to the diaphragm between the lower end of stem 23 and a flange 27 on element 22. The lower end of the latter functions as an exhaust valve seat 28 and is normally spaced from an exhaust valve 29 of the assembly 19, thus establishing communication between the outlet chamber 15 and an atmospheric port 30 through the hollow exhaust element 22 and ports 31 arranged in the wall of stem 23 and in constant communication with the exhaust chamber 14.

In order to effect movement of the diaphragm 12 and consequent operation of the valve assembly 19 through the graduating spring 25, a suitable manually-operable member such as a pedal 32 is employed which bears constantly against a button 33 carried by a cap 34 slidably received within the upper casing section 10 and having a shoulder 35 abutting the upper spring seat 24.

With a construction of the above referred to character, it will be readily understood that with the parts in their normal position shown in the drawing, the clutch motor 4 is connected to the atmospheric port 30 through conduit connection 16, outlet chamber 15, element 22, ports 31 and exhaust chamber 14. However, upon depression of the pedal 32, the compression of the graduating spring 25 will impart movement to the diaphragm 12 in order to effect a closure of the exhaust valve seat 28 through contact thereof with exhaust valve 29. Communication between conduit 15 and the atmosphere will thus be interrupted and continued movement of the pedal will open the intake valve 21 in order to admit fluid pressure from the reservoir 5 to the clutch motor 4. The outlet chamber 15 is separated from the diaphragm chamber 13 by a portion 36 of the lower casing section and communication between these two chambers is permitted through a restricted choke 37. In this manner, after fluid pressure has been admitted past valve 21 to the conduit 16, pressure is slowly built up in diaphragm chamber 13 through the choke 25. As soon as the pressure beneath the diaphragm 12, aided by the tension of the valve spring 20, reaches a value slightly in excess of the initial tension imparted to the graduating spring 25, the diaphragm 12 and parts connected therewith will be moved upwardly in order to effect closure of the intake valve 21. In this manner, the valve device is automatically moved to lapped position and this occurs each time the applying movement of the pedal 32 is arrested. It is thus seen that manual manipulation of the pedal 32 will efficiently control the application of fluid pressure to the clutch motor 4 in order to effect clutch-disengaging movement of the latter.

Assuming that the pedal 32 has been moved to such a position as to effect complete clutch-disengaging movement of the motor 4 and it is desired to engage the vehicle clutch, it is only necessary to gradually release the pedal 32 which will be returned to its normal position through the expansion of the graduating spring 25. As pressure upon the pedal 32 is relieved, it will be seen that the exhaust valve seat 28 is moving away from the exhaust valve 29, thus connecting the fluid motor to atmosphere through the connections referred to heretofore. The exhaust valve seat 28 is so moved by the pressure within the diaphragm chamber 13 which constantly tends to move the diaphragm 12 upwardly against the tension of the graduating spring 25. Should the pedal 32 be arrested in any position during its return movement, the exhausting of fluid pressure from the clutch motor will be interrupted as soon as the pressure within the diaphragm chamber 13 balances the tension in the graduating spring 25.

It will be understood that during the return movement of the pedal 32 to effect engagement of the vehicle clutch, it is necessary that the exhausting of fluid from the clutch motor be gradual in order to prevent any sudden clutch engagement which would effect jerky action of the vehicle and perhaps damage to the clutch parts. It will also be understood that in order to effect gradual and smooth engagement of the clutch, it is highly desirable to control the fluid pressure within the clutch motor with a minimum of movement of the controlling pedal 32. With the device already described, a reversal of flow of fluid pressure to the clutch motor may only be effected by an appreciable movement of the controlling pedal 32, since the latter exerts its force upon the diaphragm 12 through a graduating spring which must be either compressed or permitted to expand in order to effect the reversal of the operation of the clutch motor.

The present invention accordingly contemplates the incorporation within the valve mechanism 6 of means whereby a quick reversal of the diaphragm 12 and hence a reversal of the flow of fluid pressure to the clutch motor 4 may be effected by slight increments of movement of the pedal 32 in order that a precise and close graduation of movement of the clutch-controlling member 3 might be had under circumstances of clutch engagement. For this purpose, the pedal 32 and diaphragm 12 are directly connected through a member 38, secured to the button 33 and frictionally connected with the stem 23. Such frictional connection may be of any suitable form but is preferably resilient in nature and in the embodiment illustrated is secured through providing member 33 with a plurality of tines 39 which are resiliently urged outwardly into frictional engagement with the stem 23.

With the addition of the frictional connection between the pedal 32 and the diaphragm 12, it will be seen that there are two force-transmitting connections between the diaphragm and pedal which are arranged in parallel, namely the graduating spring and the frictional connection. It will also be observed that movement of the pedal 32 will operate the diaphragm 12 directly, up to the limit of the frictional force with which the member 38 engages the stem 23. In practice, this force is relatively small, as for example eight pounds in one type of installation, and is sufficient to effect a change in pressure of approximately two pounds per square inch within the diaphragm chamber 13 before slippage occurs between the friction member 38 and the stem 23. Thus, movement of the pedal 32 downwardly, irrespective of its then position, directly operates the valve device 19 through the member 22 up to the above referred to limit of friction, while a slight movement of the pedal upwardly immediately removes the downward force corresponding to the limit of friction and allows the pressure in chamber 13 to move the diaphragm upwardly, thus actuating the valves to effect a corresponding release of fluid pressure from the chamber. Thereafter, the control of the valve device is taken over by the graduating spring 25 in the manner heretofore described, it being understood that the sliding friction between parts 39 and 23 is less than the static friction therebetween. With such an arrangement, it will be readily appreciated that an exceedingly fine graduation of pressures within the clutch motor 4 may be obtained with comparatively slight movements of the controlling pedal 32 and reversal of fluid within the clutch motor 4 may be secured by a mere reversal of movement of the controlling pedal 32. Thus, the valve mechanism 6 is exceedingly sensitive in its control and engagement of the vehicle clutch may be secured in an extremely efficient manner.

While one embodiment of the invention has been shown and described herein, it is to be understood that the invention is not limited thereto but is capable of being embodied in various other forms. Reference will therefore be had to the appended claims for a definition of the limits of the invention.

What is claimed is:

1. In combination with a member to be actuated, a fluid pressure actuator therefor, self-lapping valve means for controlling the flow of fluid pressure to and from said actuator including a pressure-responsive member for lapping said valve means when the pressure therein reaches a predetermined value, manually-operable means for operating said valve means, and means for securing a rapid reversal of flow of fluid pressure to and from said actuator comprising a frictional connection for transmitting a predetermined force between said manually-operable means and said pressure-responsive member.

2. In combination with a member to be actuated, a fluid pressure actuator therefor, self-lapping valve means for controlling the flow of fluid pressure to and from said actuator including a pressure-responsive member for lapping said valve means when the pressure therein reaches a predetermined value, manually-operable means for operating said valve means, a graduating spring interposed between said manually operable means and pressure-responsive member, and means independent of said spring and manually-operable means for securing a reversal of said diaphragm upon a reversal of movement of said manually-operable means whereby a rapid reversal of flow of fluid pressure to and from said actuator is secured.

3. In combination with a member to be actuated, a fluid pressure actuator therefor, self-lapping valve means for controlling the flow of fluid pressure to and from said actuator including a pressure-responsive member for lapping said valve means when the pressure therein reaches a predetermined value, manually-operable means for operating said valve means, a graduating spring interposed between said manually-operable means and pressure-responsive member, and means independent of said spring and including a friction device adapted to transmit a predetermined force for securing a reversal of said diaphragm upon a reversal of movement of said manually-operable means whereby a rapid reversal of flow of fluid pressure to and from said actuator is secured.

4. In combination with a member to be actuated, a fluid pressure actuator therefor, self-lapping valve means for controlling the flow of fluid pressure to and from said actuator including a pressure-responsive member for lapping said valve means when the pressure therein reaches a predetermined value, manually-operable means for operating said valve means, a graduating spring interposed between said manually-operable means and pressure-responsive member, and means independent of said spring and directly connecting said manually-operable means and pressure-responsive member through a frictional connection adapted to transmit a predetermined force for securing a reversal of said diaphragm upon a reversal of movement of said manually-operable means whereby a rapid reversal of flow of fluid pressure to and from said actuator is secured.

5. In combination with a member to be actuated, a fluid pressure actuator therefor, self-lapping valve means for controlling the flow of fluid pressure to and from said actuator including a pressure-responsive member for lapping said valve means when the pressure therein reaches a predetermined value, manually-operable means for operating said valve means, a graduating spring interposed between said manually-operable means and pressure-responsive member, and means independent of said spring and connecting said manually-operable means and pressure-responsive member up to a predetermined pressure admitted by said valve means for securing a reversal of said diaphragm upon a reversal of movement of said manually-operable means whereby a rapid reversal of flow of fluid pressure to and from said actuator is secured.

6. In combination with a member to be actuated, a fluid pressure actuator therefor, self-lapping valve means for controlling the flow of fluid pressure to and from said actuator including a pressure-responsive member for lapping said valve means when the pressure therein reaches a predetermined value, manually-operable means for operating said valve means, a graduating spring interposed between said manually-operable means and pressure-responsive member, and means independent of said spring and so constructed and arranged as to transmit movement of said manually-operable means directly to said pressure-responsive member only up to a predetermined pressure admitted by said valve means for securing a reversal of said diaphragm upon a reversal of movement of said manually-operable means whereby a rapid reversal of flow of fluid pressure to and from said actuator is secured.

7. In a remote control mechanism for a vehicle-controlling element, a fluid motor for operating said element, and means including a remotely-positioned, operator-controlled, self-lapping valve mechanism for controlling the flow of fluid pressure to said cylinder, said mechanism including interconnected exhaust and intake valves, an actuating assembly for operating said valves including a pressure-responsive device and a graduating spring carried thereby, a member for compressing said spring to operate said valves through said device, and a frictional connection in parallel with said spring and disposed between said pedal and device for transmitting predetermined forces between said member and device.

8. In a remote control mechanism for a vehicle-controlling element, a fluid motor for operating said element, and means including a remotely-positioned, operator-controlled, self-lapping valve mechanism for controlling the flow of fluid pressure to said cylinder, said mechanism including interconnected exhaust and intake valves, a pressure-responsive device for operating said valves, a manually-operable member, and a pair of force-transmitting connections between said member and device, said connections being arranged in parallel.

9. In a remote control mechanism for a vehicle-controlling element, a fluid motor for operating said element, and means including a remotely-positioned, operator-controlled, self-lapping valve mechanism for controlling the flow of fluid pressure to said cyinder, said mechanism including interconnected exhaust and intake valves, a pressure-responsive device for operating said valves, a manually-operable member, and a pair of force-transmitting connections arranged in parallel between said member and device, one of said connections being resilient.

10. In a remote control mechanism for a vehicle controlling element, a fluid motor for operating said element, and means including a remotely-positioned, operator-controlled, self-lapping valve mechanism for controlling the flow of fluid pressure to said cylinder, said mechanism including interconnected exhaust and intake valves, a pressure-responsive device for operating said valves, a manually-operable member, and a pair of force-transmitting connections arranged in parallel between said member and device, one of said connections being frictional and connecting said device and pedal up to a predetermined limit of force transmission only.

11. In a remote control mechanism for a vehicle-controlling element, a fluid motor for operating said element, and means including a remotely-positioned, operator-controlled, self-lapping valve mechanism for controlling the flow of fluid pressure to said cylinder, said mechanism including interconnected exhaust and intake valves, a pressure-responsive device for operating said valves, a manually-operable member, and a pair of force-transmitting connections arranged in parallel between said member and device, one of said connections being inoperative after a predetermined limit of force transmission has been attained.

12. Fluid pressure control valve mechanism comprising a casing, interconnected exhaust and intake valves mounted in said casing, a movable pressure-responsive device in said casing for operating said valves, an actuating member, a stem secured to said device and extending upwardly therefrom, a cap slidably mounted in said casing and operatively related with said member, a graduating spring interposed between said device and cap, and a second member for directly operating said device, said second member being secured to said cap and frictionally connected with said stem for transmitting a predetermined force therebetween.

13. Fluid pressure control valve mechanism comprising a casing, interconnected exhaust and intake valves mounted in said casing, a movable pressure-responsive device in said casing for operating said valves, an actuating member, a tubular member secured to said device and extending upwardly therefrom, a cap slidably mounted in said casing and operatively related with said actuating member, a graduating spring interposed between said device and cap, and an element for directly operating said device, said element being secured to said cap, extending into said tubular member and frictionally connected therewith.

14. Fluid pressure control valve mechanism comprising a casing, interconnected exhaust and intake valves mounted in said casing, a movable pressure-responsive device in said casing for operating said valves, an actuating member, a tubular member secured to said device and extending upwardly therefrom, a cap slidably mounted in said casing and operatively related with said actuating member, a graduating spring interposed between said device and cap, and means for directly connecting said actuating member and device comprising an element carried by said cap, extending into said tubular member and having portions expanded into frictional contact wth said tubular member.

15. In a remote control mechanism for a vehicle-controlling element, a fluid motor for operating said element, and means including a remotely-positioned, operator-controlled, self-lapping valve mechanism for controlling the flow of fluid pressure to said cylinder, said mechanism including interconnected exhaust and intake valves, a pressure-responsive device for operating said valves, a manually-operable member, a graduating spring between said member and device, and means for frictionally connecting said member and device including an element having a plurality of fingers.

16. In a self-lapping valve mechanism having an outlet chamber, the combination of means including a resilient member adjustable for controlling the establishment of a predetermined pressure in said chamber, movable means for adjusting said member, and means responsive to movement of said second named means for effecting a change of pressure in said chamber prior to the establishment of said predetermined pressure.

17. In a self-lapping valve mechanism having an outlet chamber, the combination of means including a resilient member adjustable for controlling changes of fluid pressure in said chamber, means for adjusting said member, and frictional means responsive to movement of said second named means for effecting a predetermined pressure change in said chamber prior to the occurrence of a change of pressure therein controlled by said resilient member.

18. In a self-lapping valve device having valve operating mechanism and an actuating member therefor, the combination of resilient means interposed between said valve operating mechanism and member for controlling the operation of said mechanism, and frictional means interposed between said mechanism and member for exerting a predetermined degree of controlling action on said mechanism in advance of the controlling action exerted thereon by said first named means.

19. In a self-lapping valve device having valve operating mechanism and an actuating member therefor, the combination of resilient means interposed between said valve operating mechanism and member and responsive to movement of said member for controlling the operation of said mechanism, and frictional force transmitting means connecting said mechanism and member and responsive to movement of said member for exerting a controlling action on said mechanism in advance of a corresponding controlling action of said resilient means.

20. In a self-lapping valve device having valve operating mechanism and an actuating member therefor, the combination of resilient means compressible on movement of said member in one direction for controlling the operation of said valve mechanism, and means interposed between said mechanism and member for retarding expansion of said resilient means on movement of said member in a reverse direction.

21. Fluid pressure control valve mechanism comprising a casing, intake and exhaust valves mounted in said casing, a movable pressure responsive device in said casing for operating said valves, an actuating member, a spring compressible between said device and actuating member for operating said device, and means interposed between said device and member and responsive to movement thereof for actuating said device prior to operation thereof by said spring.

ROY S. SANFORD.
WILLIAM J. ANDRES.